United States Patent [19]

Balla

[11] 3,985,604
[45] Oct. 12, 1976

[54] METHOD FOR THE MANUFACTURE OF LAMINATED PACKING MATERIAL CONTAINING METAL FOIL

[75] Inventor: Gyula Balla, Malmo, Sweden

[73] Assignee: Deering Milliken Research Corporation, Spartanburg, S.C.

[22] Filed: July 30, 1974

[21] Appl. No.: 493,025

Related U.S. Application Data

[63] Continuation-in-part of Ser. No. 296,922, Oct. 12, 1972, abandoned.

[30] Foreign Application Priority Data

Nov. 26, 1971 Sweden............................ 151421/71

[52] U.S. Cl.................................. 156/244; 156/272; 219/10.41; 427/46
[51] Int. Cl.²................... B23K 13/00; B29B 27/04
[58] Field of Search ............ 156/272, 273, 274, 244; 427/46; 428/461; 219/10.61, 10.71, 10.41

[56] References Cited

UNITED STATES PATENTS

| 2,960,777 | 11/1960 | Doll........................................ 219/10.61 |
| 3,402,086 | 9/1968 | Smith et al............................. 156/244 |
| 3,470,621 | 10/1969 | Bennett................................... 219/10.61 |
| 3,503,823 | 3/1970 | Richart et al...................... 428/461 X |
| 3,556,887 | 1/1971 | Adcock et al......................... 156/272 |

*Primary Examiner*—Douglas J. Drummond
*Assistant Examiner*—M. G. Wityshyn
*Attorney, Agent, or Firm*—Earle R. Marden; H. William Petry

[57] ABSTRACT

The present invention concerns a method for the manufacture of laminated packing material containing at least one layer of a metal foil, e.g., aluminum foil, and a layer of plastic material applied to the said metal foil. The invention also concerns an apparatus for the realization of the method for the manufacture of laminated packing material.

1 Claim, 1 Drawing Figure

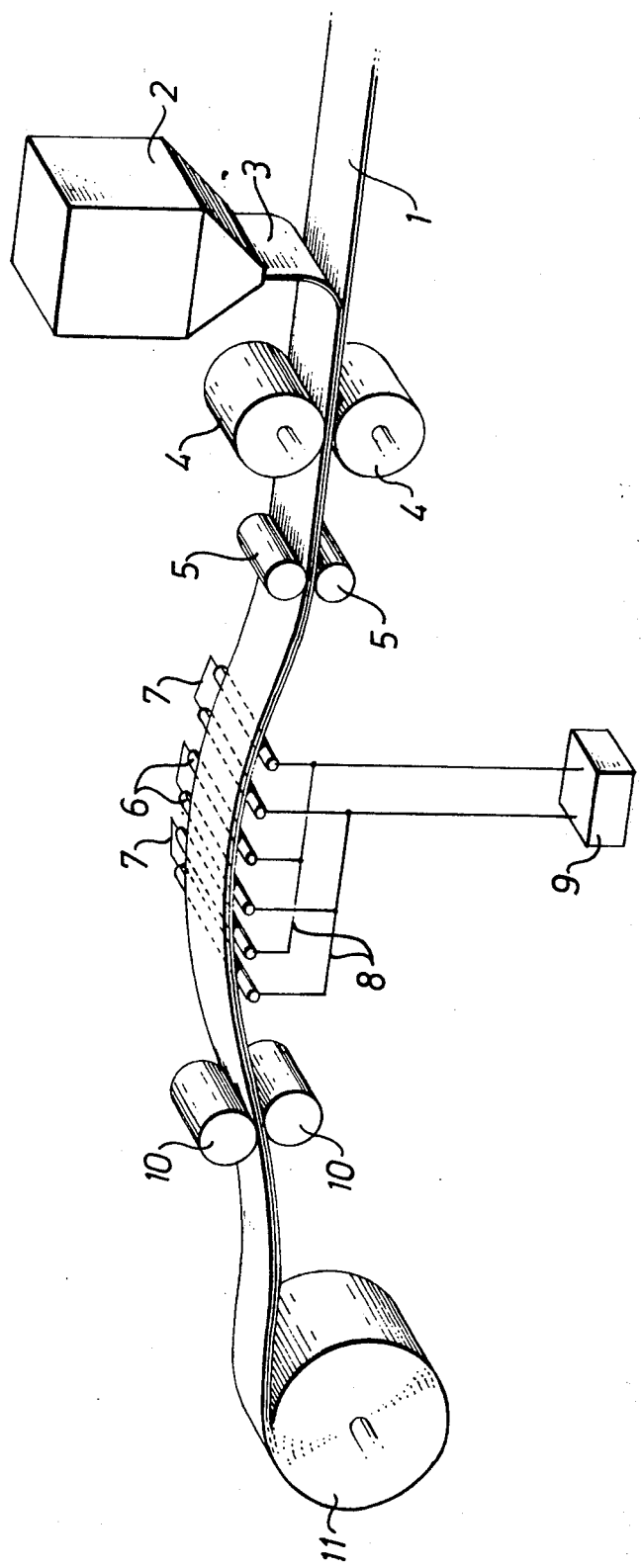

METHOD FOR THE MANUFACTURE OF LAMINATED PACKING MATERIAL CONTAINING METAL FOIL

This is a continuation of application Ser. No. 296,922, filed Oct. 12, 1972 now abandoned.

Modern packages, which are manufactured from a web of packing laminate or from sheet of laminated material, frequently comprise a layer of a metal foil, in particular aluminum foil, which lends the packing laminate very good tightness characteristics against gases and moreover gives very effective light protection. The packing laminate of the type concerned here furthermore frequently comprises a base layer of some kind, in particular paper of carton, and also linings of thermoplastic material, which linings on the one hand are intended to protect the finished packages from moisture and wetness, on the other hand have the object of making the packing laminate heat-sealable and finally have the object of joining together the material layer introduced into the laminate.

The side of the packing laminate which will be turned toward the inside of the finished package is generally covered with a layer of thermoplastic material, e.g., polyethylene, and the material layer following this is usually constituted of a metal foil layer which then in its turn is fixed to a supporting paper layer with the help of an intermediate thermoplastic coat of e.g., polyethylene. Finally, the outside of the packing laminate, that is to say the side of the packing laminate which will form the outside of the package, will be provided with a thermoplastic coat of e.g., polyethylene, which has as its object the protection of the base layer of paper and the prevention of the absorption of moisture by the said layer.

In the coating of plastic onto aluminum foil or other metal foil it has been found that the coating can take place by means of a normal extrusion process which implies the extrusion of a melted plastic mass under high pressure through a narrow, slotlike opening to form a thin film which is precipitated onto the metal foil layer, whereupon the metal foil coated with the plastic material is introduced between compressive rollers, which at the same time have a cooling effect. It is quite possible in itself to produce by this method a relatively good adhesion between the coated plastic layer and the metal foil layer, which, moreover, can be combined in advance with the said base paper layer, but in such a case the extrusion of plastic material has to be carried out at a very high temperature, that is to say at a temperature which at the extrusion of polyethylene exceeds 300° C. At this relatively high temperature the plastic material is exposed to a surface oxidation which unfortunately has the result that the plastic layer can no longer be heat-sealed as easily as if it had not been oxidized. As it is imperative that the inside layer of the packing laminate should be heat-sealable, since otherwise tight packages cannot be obtained, it is necessary in the coating of the plastic material onto the metal foil layer to use an extrusion temperature which is so low that the plastic material is not oxidized. Thus an extrusion temperature has to be used which is between 250° and 300° C. approximately and in the choice of the extrusion temperature a number of outside factors have to be taken into account, such as e.g., the plastic quality, the room temperature, the rate of extrusion etc. As mentioned above, a worse adhesion is obtained between plastic layer and metal foil layer if the extrusion temperature is low, which implies that the plastic layer in the finished package may delaminate and thus in principle form a plastic bag inside the package which is free from the metal foil layer. This of course is not desirable, but it must be the object to obtain a non-oxidized inner plastic layer as well as good adhesion between plastic layer and metal foil, and in order to achieve this it was necessary to accept a compromise between sealability and lamination strength and accordingly the lamination temperature had to be adjusted and maintained very accurately, which may cause great difficulties.

To overcome the abovementioned disadvantages it is proposed in accordance with the invention to carry out the lamination in two operational stages, whereby in a first operational stage the thermoplastic material is applied by means of extrusion to the metal foil layer, and the extrusion temperature of the thermoplastic material is adjusted so that there is no appreciable oxidation of the thermoplastic material, whereupon the laminate material in a second stage of the operation is exposed to the effect of a high frequency electro-magnetic field, with the help of which induction currents are generated in the metal foil layer, which causes the said metal foil layer to be heated up and by means of convection to transmit heat to the thermoplastic layer or thermoplastic layers facing the metal layer. The invention is characterized further in that the device for the execution of the said second operational stage consists of one of several coils preferably arranged in one plane, which are connectable to a source of current which can deliver an a.c. current of high frequency.

In the following will be described an embodiment of the invention with reference to the enclosed schematic drawing, which shows a perspective sketch in accordance with the invention.

In the FIGURE numeral 1 refers to a laminate web the upward turned layer of which consists of a metal foil layer or a metal foil web. An extrusion device is marked 2 and a plastic film pressed out by the extrusion device is marked 3. Furthermore a pair of compression rollers cooperating with one another is marked 4 and a pair of guide rollers 5. A number of insulated metal bars are designated 6 and electrical connections between metal bars 7. A high frequency current source is designated 9 and the feed lines from the source of current 9 to the bars 6 are marked 8. Finally a second pair of compression rollers is designated 10 and a magazine roller for the finished packing material is designated 11.

The method for the manufacture of the laminate consists in that the metal foil web 1 or a packing laminate web 1, which comprises e.g., a supporting layer of paper and a metal foil layer, e.g., aluminum foil layer which is facing upward, is guided past an extruder 2 with the help of which a thin plastic film 3 of e.g., polyethylene is pressed through a narrow slot at high pressure and is brought into contact with the moving web 1. The plastic layer 3 is combined with the aluminum foil layer of the web 1 in that the material is pressed together between cooled rollers 4. This first stage in the chain of operations is carried out in such a manner that the plastic film 3 which is produced through the nozzle of the extruder device 2 does not become oxidized, which implies that the extrusion is carried out at relatively low temperature, that is to say a temperature between 260° and 280° C. and at least lower than 300° C. As mentioned earlier, it is difficult to establish accurately a certain critical temperature at which the oxidation sets in, since the oxidation process depends upon the composition of the plastic material, the time during which the plastic is heated before it is cooled, the temperature and humidity of the air in the locality where the treatment is carried out etc. It has been found, however, that at extrusion temperatures below 250° C. there is hardly any risk of oxidation when the plastic is applied to the metal foil layer by means of a normal extrusion process which implies that the coated material is introduced as rapidly as possible after the coating between cooled compression rollers. It was also found that an unacceptable oxidation of the plastic material is obtained at extrusion temperatures which are above 300° C. even if conditions otherwise favoring oxidation are avoided. In the case described here it is assumed that the coating takes place at a temperature between 260° and 280° C., which implies that the plastic layer 3 is not oxidized, but that on the other hand the adhesion between plastic layer 3 and metal foil layer 2 remains unsatisfactory. To improve the adhesion between the plastic layer 3 and the metal foil layer 1 the laminate web is passed further between guiding rollers 5 or alternatively over one guide roller 5 to the induction heating device, which consists of a number of insulated metal bars 6, which in the case shown here are arranged so that a slightly arched shape is imparted to the web 1 when it is passed over the rods 6, which is done so as to ensure that the web will come into contact with all the bars 6. The bars 6, which in the case reported here are arranged in three coils in series with one winding in each coil, are connected to a source of high frequency current 9 by means of which a high frequency current with a voltage between e.g., 100–200 V and a frequency of 100 kilohertz – 1000 kilohertz is passed through the coil windings formed by the bars 6 and the connections 7, whereby an electromagnetic field is generated which is directed perpendicularly to the surface of the coils, that is to say the generating electromagnetic field will pass the laminate web and its metal foil layer. When the high frequency electromagnetic field passes the web 1 induction currents are induced in the conducting metal foil layer, which induction currents heat the metal foil layer. The induced effect, which is a function of the speed of advance of the web, of the width of the web, of the desired heating temperature, is adjusted in the case described here so that the metal foil layer is heated to a temperature of approximately 100° C. The heat will be transmitted directly through heat conduction to the adjoining plastic layer 3 so that the latter is heated on the side which is facing the metal foil layer. Directly after the induction heating the laminate is introduced between compression rollers 10, which can be cooled and with the help of which the plastic layer 3 is pressed against the warm metal foil layer. Through this treatment an appreciably better adhesion is achieved between the plastic layer 3 and the metal foil layer without any risk of oxidation of the plastic layer 3. The laminated material treated is then wound up on a magazine roller 11 and is ready for use either in the form of a web which is converted to packing units or in the form of packing material which is punched out of the web.

It may be appropriate in certain cases to heat the metal foil layer to a temperature which appreciably exceeds 100° C., e.g., 150° – 200° C., but to prevent in this case the plastic layer from melting down it may be appropriate to apply a cooling gas, e.g., a cold air against the outside of the plastic layer 3.

Naturally it is possible within the framework of the concept of the invention to arrange the coils, by means of which the electromagnetic field is generated, in some other manner than that shown here, but practical experiments have suggested that the embodiment described here is especially suitable, at least in the treatment of relatively flexible material webs. It may of course be appropriate sometimes to cool the coil windings, that is to say the bars 6 which can readily be done by providing the bars 6 with bores through which a cooling liquid can be made to circulate.

That which is claimed is:

1. Method of manufacturing a laminated packaging material which has at least one thermoplastic layer and one foil layer comprising the steps of: supplying a web of metal foil, extruding a layer of thermoplastic material on the web of metal foil at a temperature between 260° and 280° C, passing the metal foil with thermoplastic material extruded thereon over and in contact with a plurality of metal bars forming an arched path in the direction of travel of the metal foil, generating induction currents in said metal foil as it passes over the bars by passing a high frequency current of 100 kilohertz – 1000 kilohertz through the metal bars to complete the lamination of the thermoplastic material to said web of foil.

* * * * *

UNITED STATES PATENT OFFICE
CERTIFICATE OF CORRECTION

Patent No. 3,985,604          Dated October 12, 1976

Inventor(s) Gyula Balla

It is certified that error appears in the above-identified patent and that said Letters Patent are hereby corrected as shown below:

Column 2, line 30, delete "of" and substitute --or--.

Signed and Sealed this

Fifteenth Day of February 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,985,604  Dated October 12, 1976

Inventor(s) Gyula Balla

It is certified that error appears in the above-identified patent and that said Letters Patent are hereby corrected as shown below:

Assignee should be Tetra Pak International AB, Lund, Sweden.

Signed and Sealed this

First Day of November 1977

[SEAL]

Attest:

RUTH C. MASON
*Attesting Officer*

LUTRELLE F. PARKER
*Acting Commissioner of Patents and Trademarks*